(12) United States Patent
Houze et al.

(10) Patent No.: US 10,298,933 B2
(45) Date of Patent: May 21, 2019

(54) METHOD FOR COMPOSING AN INTERMEDIATE VIDEO REPRESENTATION

(71) Applicant: Orange, Paris (FR)

(72) Inventors: Patrice Houze, Rennes (FR); Felix Henry, Saint Gregoire (FR)

(73) Assignee: ORANGE, Paris (FR)

(*) Notice: Subject to any disclaimer, the term of this patent is extended or adjusted under 35 U.S.C. 154(b) by 37 days.

(21) Appl. No.: 15/527,949

(22) PCT Filed: Nov. 24, 2015

(86) PCT No.: PCT/FR2015/053197
§ 371 (c)(1),
(2) Date: May 18, 2017

(87) PCT Pub. No.: WO2016/083730
PCT Pub. Date: Jun. 2, 2016

(65) Prior Publication Data
US 2017/0332080 A1    Nov. 16, 2017

(30) Foreign Application Priority Data
Nov. 27, 2014   (FR) ..................................... 14 61564

(51) Int. Cl.
*H04N 19/15*   (2014.01)
*H04N 19/103*  (2014.01)
(Continued)

(52) U.S. Cl.
CPC .......... *H04N 19/15* (2014.11); *H04N 19/103* (2014.11); *H04N 19/17* (2014.11); *H04N 19/184* (2014.11);
(Continued)

(58) Field of Classification Search
None
See application file for complete search history.

(56) References Cited

U.S. PATENT DOCUMENTS 6,614,845 B1 * 9/2003 Azadegan .............. H04N 19/61
375/240.13
8,270,487 B1 * 9/2012 Kizhepat ................ H04N 19/48
375/240.12

(Continued)

FOREIGN PATENT DOCUMENTS

EP        1400929 A2     3/2004
WO    2006017382 A1     2/2006

OTHER PUBLICATIONS

Inoue et al., "Interactive Panoramic Video Streaming System over Restricted Bandwidth Network", Proc. of Int'l Conf. on Multimedia, MM '10 held on Oct. 25-29, 2010 in Florence, Italy, Proceedings published on Jan. 1, 2010, pp. 1191-1194 (Year: 2010).*

(Continued)

*Primary Examiner* — Reza Aghevli
(74) *Attorney, Agent, or Firm* — David D. Brush; Westman, Champlin & Koehler, P.A.

(57) ABSTRACT

A method for composing an intermediate representation of a video sequence from at least two different representations of the video sequence, the at least two representations being spatially partitioned into a plurality of tiles, each tile being associated with compressed data in the representation. The method is such that the tiles can be decoded independently from one another and at a given time the various representations are partitioned identically. The method includes selecting, according to at least one selection criterion, a set of tiles forming a partition of the sequence from the at least two representations, and composing an intermediate representation of the video sequence from compressed data associated with the selected set of tiles. The method can be implemented in a video decoding terminal or broadcasting server.

14 Claims, 7 Drawing Sheets

Figure 1:
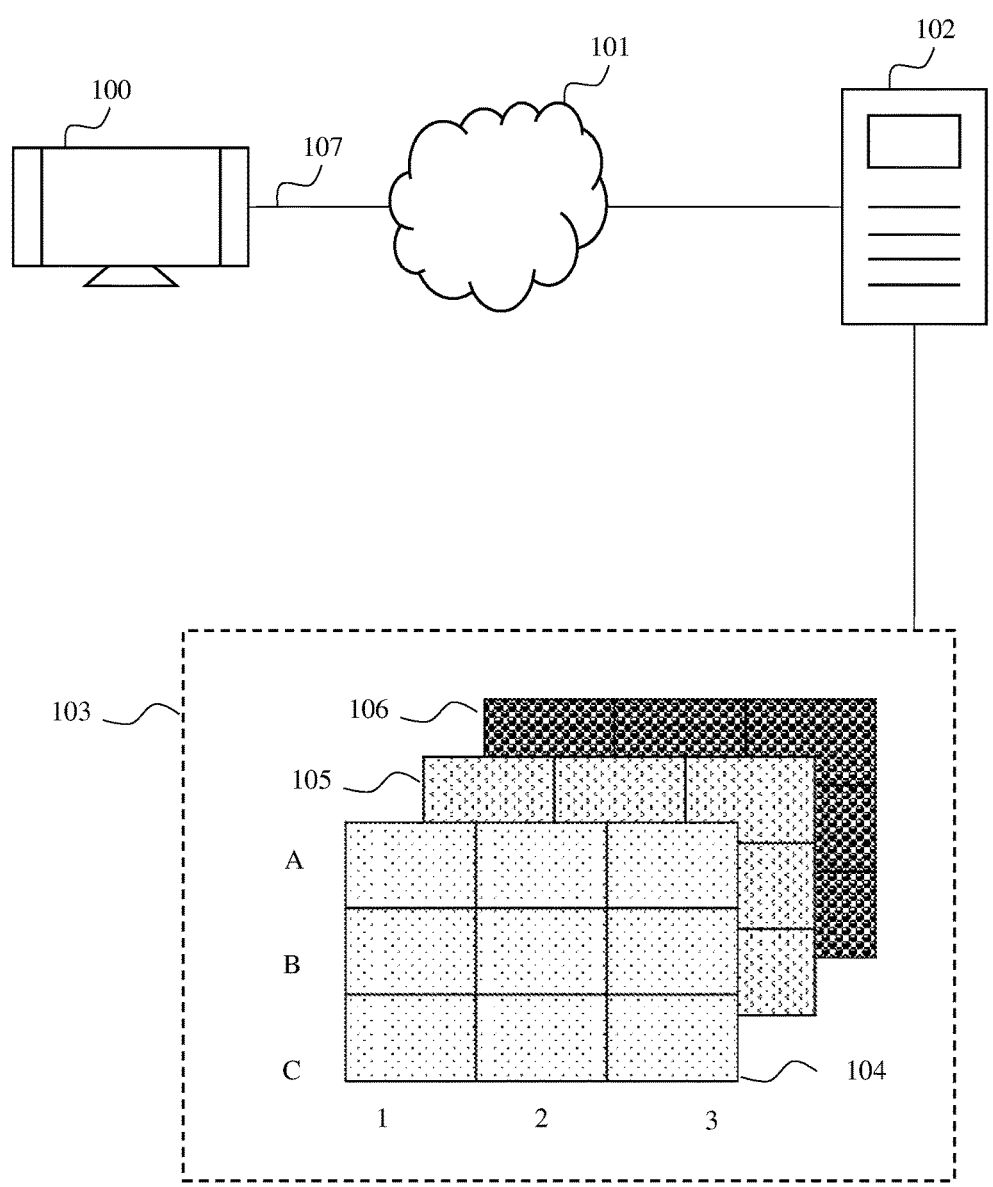

(51) Int. Cl.
  *H04N 19/17* (2014.01)
  *H04N 19/48* (2014.01)
  *H04N 19/40* (2014.01)
  *H04N 19/184* (2014.01)
  *H04N 19/176* (2014.01)
  *H04N 19/174* (2014.01)

(52) U.S. Cl.
  CPC .............. *H04N 19/40* (2014.11); *H04N 19/48* (2014.11); *H04N 19/174* (2014.11); *H04N 19/176* (2014.11)

(56) References Cited

U.S. PATENT DOCUMENTS

| | | | |
|---|---|---|---|
| 2006/0002474 A1* | 1/2006 | Au | H04N 19/56 375/240.16 |
| 2009/0086816 A1* | 4/2009 | Leontaris | H04N 19/80 375/240.03 |
| 2009/0175333 A1* | 7/2009 | Hsiang | H04N 19/63 375/240.12 |
| 2010/0177828 A1* | 7/2010 | Rubinstein | G06F 15/8015 375/240.26 |
| 2011/0090960 A1* | 4/2011 | Leontaris | H04N 19/103 375/240.12 |
| 2012/0016965 A1* | 1/2012 | Chen | H04N 21/23439 709/219 |
| 2012/0023249 A1* | 1/2012 | Chen | H04N 21/235 709/231 |
| 2012/0023250 A1* | 1/2012 | Chen | H04N 21/23432 709/231 |
| 2013/0003839 A1* | 1/2013 | Gao | H04N 19/50 375/240.12 |
| 2013/0058405 A1* | 3/2013 | Zhao | H04N 19/176 375/240.12 |
| 2013/0194384 A1* | 8/2013 | Hannuksela | H04N 19/597 348/43 |
| 2014/0307775 A1 | 10/2014 | Ouedraogo et al. | |
| 2015/0010069 A1* | 1/2015 | Guignard | H04N 19/105 375/240.12 |
| 2015/0012708 A1* | 1/2015 | Rubinstein | G06F 15/8015 711/125 |
| 2015/0110167 A1* | 4/2015 | Chen | H04N 19/70 375/240.01 |
| 2016/0050411 A1* | 2/2016 | Wang | H04N 19/00733 375/240.16 |

OTHER PUBLICATIONS

English Translation of Written Opinion of the International Searching Authority dated, Feb. 17, 2016 for corresponding International Application PCT/FR2015/053197, filed Nov. 24, 2015.

International Search Report dated Feb. 4, 2016, for corresponding International Application No. PCT/FR2015/053197, filed Nov. 24, 2015.

Written Opinion of the International Searching Authority dated Feb. 4, 2016, for corresponding International Application No. PCT/FR2015/053197, filed Nov. 24, 2015.

Masayuki Inoue et al., "Interactive Panoramic Video Streaming System Over Restricted Bandwidth Network", Proceedings of the International Conference on Multimedia, MM '10, Jan. 1, 2010 (Jan. 1, 2010), p. 1191, XP055120221.

French Search Report and Written Opinion dated Jul. 13, 2015 for corresponding French Application No. 1461564, filed Nov. 27, 2014.

* cited by examiner

METHOD FOR COMPOSING AN INTERMEDIATE VIDEO REPRESENTATION

CROSS-REFERENCE TO RELATED APPLICATIONS

This Application is a Section 371 National Stage Application of International Application No. PCT/FR2015/053197, filed Nov. 24, 2015, the content of which is incorporated herein by reference in its entirety, and published as WO 2016/083730 on Jun. 2, 2016, not in English.

TECHNICAL FIELD

The subject of the present invention lies in the field of digital video coding and more specifically in the field of video compression.

STATE OF THE ART

Internet access technologies now make it possible to view a high-quality video sequence without first downloading the complete sequence. To this end, video decoders implement continuous reading techniques, called video "streaming" techniques, whereby the data packets are downloaded at a rate corresponding to the bit rate of the encoded video. The decoding and playback of a video frame can thus be performed in parallel with the downloading of the subsequent frames.

The drawback with this solution is that it is not possible to adapt to the quality of the connection of the user. Thus, it is often necessary for the broadcaster to offer, for the same video sequence, several versions encoded at different bit rates in order for the video players of the users to be able to choose a version compatible with the connection.

The modern video transport standards such as MPEG-DASH (Dynamic Adaptive Streaming over HTTP) provide for the video streams to be subdivided into a plurality of segments, each of the segments being available in different versions encoded at different bit rates. Thus, while one segment is being read by an MPEG-DASH client, the client automatically selects the next segment from the different versions available according to the network conditions detected. The choice of the version best suited to the network conditions is thus made automatically by the MPEG-DASH client, transparently to the user.

Despite all the advantages of this solution, the choice remains limited to the versions made available by the broadcaster and is not always optimal for the user. For example, if a video sequence is available in two versions, the first version being encoded at 4 MB/s and the second version being encoded at 1 MB/s, a user having a 3.5 MB/s connection will have to accept the low-quality version. Thus, to offer the best quality to their users, the broadcasters have to host numerous versions of one and the same content. Unfortunately, the coding and the storage of the different versions require a significant infrastructure which has a not-inconsiderable cost for the broadcasters, even though some versions will be invoked very little by the users.

Another approach for handling the adaptation to the bandwidth of the network consists in using a scalable coding. Scalability is the possibility of being able to offer a coded video stream with different quality levels. The signal is coded in a single binary stream so as to offer the possibility of decoding base stream and so-called enhancement streams whose quality increases successively. The scalability can be implemented according to different, spatial, temporal or quality-related, modalities. When a spatial scalability is implemented, the enhancement streams make it possible to improve the resolution of the content. A temporal scalability makes it possible to offer several temporal frequencies of the signal, the enhancement streams making it possible to progressively increase the frequency of the images of a decoded video stream. Finally, the scalability in terms of quality (or SNR, signal-to-noise ratio) makes it possible to improve the quality reducing the quantization distortion between the original image and the reconstructed image. These different modalities can be used jointly or independently of one another.

Scalability therefore allows for a fine adaptation of the quality of a video sequence to the bandwidth available. However, these techniques incur a significant coding and decoding complexity and require a bandwidth overhead of the order of 20%, which is often counter-productive compared to a multiple bit-rate coding as described previously.

There is therefore a need for an adaptive streaming solution which is capable of being adapted optimally to the bandwidth available, which does not require numerous versions of one and the same content to be hosted and which does not cause increased bandwidth consumption.

SUMMARY OF THE INVENTION

To this end, the invention relates to a method for composing an intermediate representation of a video sequence from at least two different representations of said video sequence, said at least two representations being spatially partitioned into a plurality of tiles, each tile being associated with compressed data in said representation, the method being such that the tiles can be decoded independently of one another and that, at a given instant, the different representations are partitioned identically, the method comprising steps of selection, according to at least one selection criterion, of a set of tiles forming a partition of the sequence, originating from the at least two representations, and of composition of an intermediate representation of the video sequence from the compressed data associated with the selected set of tiles.

The invention thus makes it possible to compose a new intermediate representation from at least two different representations of one and the same sequence, without requiring the encoding or the storage of the composed representation. To this end, the images corresponding to one and the same instant in the different representations are partitioned identically and into a plurality of tiles so that, at each instant, the partitioning of an image in one representation corresponds to the partitioning of the corresponding image in the other representations.

The term tile corresponds here to a rectangular region defined spatially for an image or a group of images. In the context of the invention, the images that make up the video sequence are partitioned into tiles, the tiles being encoded in such a way that they can be decoded independently of one another. For example, the HEVC video coding standard (ISO/IEC 23008-2 MPEG-H Part 2 and ITU-T H.265) defines the concept of tiles to allow for the parallelization of the encoding and decoding processes and offers the tools needed for video encoding such that the tiles can be decoded independently of one another.

The intermediate representation is thus composed of tiles that can be decoded independently and derived from at least two of the available representations. By adjusting the number of tiles originating from one and the other of the two representations, it is possible to obtain different variants of the intermediate representation, without the overhead incurred by the conventional scalability techniques. Also, contrary to the conventional multiple bit-rate encoding techniques, this new representation does not occupy additional space on the broadcast servers. The method can thus allow a video streaming system to optimally adapt the video stream to the bandwidth available without requiring numerous versions of one and the same content to be hosted and without causing increased bandwidth consumption.

According to another particular embodiment, the method is such that it further comprises steps of:
   computation of the resulting bit rate of the intermediate representation,
   checking that the resulting bit rate is below a predetermined threshold, and
   selection of a new set of tiles when the resulting bit rate is above the predetermined threshold.

Thus, when the representations from which a new representation is composed are respectively encoded at a first bit rate and at a second bit rate, the method advantageously makes it possible to obtain a representation whose bit rate lies between that of the first representation and that of the second representation. By varying the number of tiles derived from one and the other of the representations, the method makes it possible to offer representations at different bit rates in order to finely adapt the bit rate of the video stream to the bandwidth available.

According to a particular embodiment, the intermediate representation is composed on demand, as the decoding proceeds. The proportion of tiles originating from one or the other of the representations to compose the intermediate representation can then vary over time as a function of the bandwidth available on the connection. The method thus makes it possible to adjust the quality of the representation according to the bandwidth available at a given instant.

According to a particular embodiment, the method is such that the at least one selection criterion comprises the tile encoding bit rate.

The tiles are selected according to their encoding bit rate from one or the other of the different representations. The composition method thus makes it possible to strategically select tiles from different available representations so as to compose a stream whose bit rate does not exceed a limit set previously to correspond for example to the bandwidth available on the network.

The method can also comprise, according to another particular embodiment, a preliminary step of obtaining an information item relating to the bandwidth available on the network. The method is thus capable of composing a representation whose bit rate is optimal with respect to the network conditions. For example, the bandwidth available can be estimated from the level of filling of a buffer memory of a device for decoding the video stream.

According to a particular embodiment, the method is such that the at least one selection criterion comprises a tile quality indication.

In this way, the method makes it possible to obtain a representation of intermediate quality between different pre-encoded representations. The quality indication can for example be an indication relating to the signal-to-noise ratio.

According to a particular embodiment, the method is such that the tile selection step is also based on an analysis of the content of the images.

The method is based on regions of interest (or ROI) in order to select the tiles from the different representations available. These regions of interest can for example comprise faces or text. For example, this embodiment advantageously makes it possible to select tiles comprising ROIs from a representation of good quality and other tiles not comprising any ROIs from a representation of worse quality. The method thus makes it possible to obtain a representation of intermediate quality which preserves the quality of the interesting elements of the sequence.

According to a particular embodiment, an identification of the tiles containing regions of interest is performed during a step prior to the coding of the sequence, the identification information being transmitted to a device implementing the composition method so as to be able to compose a video stream in which the regions of interest can be preserved from a degradation of the quality.

According to a particular embodiment, the method is such that the selection of a tile is made according to at least one criterion for selection of at least one adjacent tile.

The method thus makes it possible to ensure that tiles that are adjacent in the composed stream do not exhibit a significant quality difference. For example, when an intermediate representation is composed from three pre-encoded representations of different quality, the method can avoid having a tile originating from the representation of the lowest quality adjacent to a tile originating from the representation of the highest quality. The method thus makes it possible to effect a smoothing making the quality differences of contiguous tiles less noticeable.

According to a particular embodiment, the tiles which make up the intermediate representation are selected during a step prior to the decoding and a description of the different tiles that make up the sequence is stored. The method thus makes it possible to precompute a set of tiles making it possible to obtain a video stream whose bit rate is determined previously. For example, a content broadcaster can conventionally make available a certain number of representations of a video sequence encoded at different bit rates and preselect sets of tiles from these representations so as to compose representations of the sequence at intermediate bit rates. By storing only a description in which the tiles making it possible to compose intermediate representations are identified, the broadcaster can increase the number of representations available for the users while limiting the additional storage space needed to store these representations. Also, the prior selection of the tiles minimizes the processing time during the viewing of the representation.

According to another particular embodiment, the method is such that the selection criterion is transmitted by a decoding terminal.

Thus, a broadcast server implementing the composition method can receive an indication of the way to select the tiles. For example, a video decoder having an interface suitable for a user to select a region of the image can transmit a selection criterion indicating that the tiles that make up the region selected by the user must be selected from a representation of good quality.

The invention relates also to a method for downloading an intermediate representation on a terminal such that it comprises steps of reading of an indication representative of the capacity of a server to compose an intermediate representation of a video sequence, of transmission of a tile selection criterion, and of receipt of an intermediate representation composed according to the selection criterion transmitted in accordance with the composition method.

The criterion transmitted can for example be a quality, bit rate or image frequency criterion. For example, a decoding terminal which wants to download content can determine whether the server is capable of supplying it with a representation adapted to its network connection. On receiving such information, a video decoding terminal can send a download request by specifying a maximum bit rate for the representation of the sequence in order to receive a representation composed according to the bit rate criterion transmitted.

According to a particular representation, the downloading method is such that it further comprises a step of selection, on a graphical interface, of image regions whose quality must be preserved in the composition and a step of transmission of this selection to the server.

A video decoder that has an interface suitable for a user to select a region of the image can thus transmit a selection criterion indicating that the tiles that make up the region selected by the user must be selected for example from a representation of good quality.

According to a particular embodiment, the downloading method is such that it further comprises a step of transmission of a tile selection criterion.

Thus, a video decoding terminal can control the selection of a particular set of tiles. For example, a terminal can ask for low-quality tiles to be selected on the perimeter of the video and for tiles of good quality to be selected at the center thereof. A decoding terminal can also offer the possibility for a user to select a region of the video that he or she wants to view with good quality and transmit the appropriate selection criterion for tiles of good quality to be selected for this region.

The invention relates also to a device for composing an intermediate representation of a video sequence from at least two different representations of said video sequence, said at least two representations being spatially partitioned into a plurality of tiles, each tile being associated with compressed data in said representation, the device being characterized in that the tiles can be decoded independently of one another and in that, at a given instant, the different representations are partitioned identically, the device comprising modules for:
    selecting, according to the at least one selection criterion, a set of tiles forming a partition of the sequence, originating from the at least two representations, and
    composing an intermediate representation of the video sequence from the compressed data associated with the selected set of tiles.

The invention relates also to a server comprising a composition device as described above.

The invention relates also to a terminal comprising a composition device as described above.

According to another aspect, the invention relates also to a device for downloading an intermediate representation such that it comprises a unit for reading an indication representative of the capacity of a server to compose an intermediate representation of a video sequence, communication means capable of transmitting a tile selection criterion, and of receiving an intermediate representation composed according to the transmitted selection criterion and in accordance with the composition method described.

According to a particular embodiment, the invention relates to a decoding terminal comprising a device for downloading an intermediate representation.

The invention relates also to a computer program comprising instructions for executing the steps of the composition method and/or for executing the steps of the downloading method, when said program is run by a processor.

Finally, the invention relates to a processor-readable information medium on which is stored a computer program comprising instructions for executing the steps of the composition method and/or instructions for executing the downloading method.

The information medium can be any entity or device capable of storing the program. For example, the medium can comprise a storage means, such as a ROM, for example a CD ROM or a microelectronic circuit ROM, or else a magnetic storage means, for example a diskette (floppy disk) or a hard disk. Also, the information medium can be a transmissible medium such as an electrical or optical signal, which can be routed via an electrical or optical cable, wirelessly or by other means. The program according to the invention can in particular be downloaded over a network of Internet type.

Alternatively, the information medium can be an integrated circuit in which the program is incorporated, the circuit being suitable for executing or for use in the execution of the method concerned.

The various embodiments or implementation features mentioned above can be added, independently or in combination with one another, to the steps of the composition method and/or of the downloading method as defined above.

The servers, devices and programs offer at least advantages similar to those conferred by the composition method described above.

LIST OF FIGURES

Figure 2A:
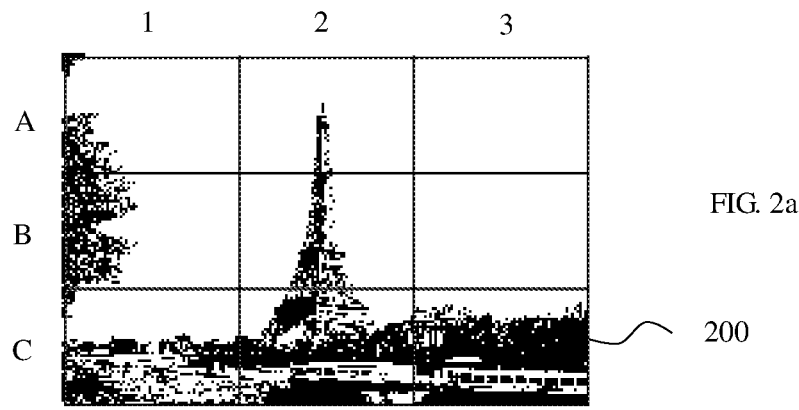
Figure 2B:
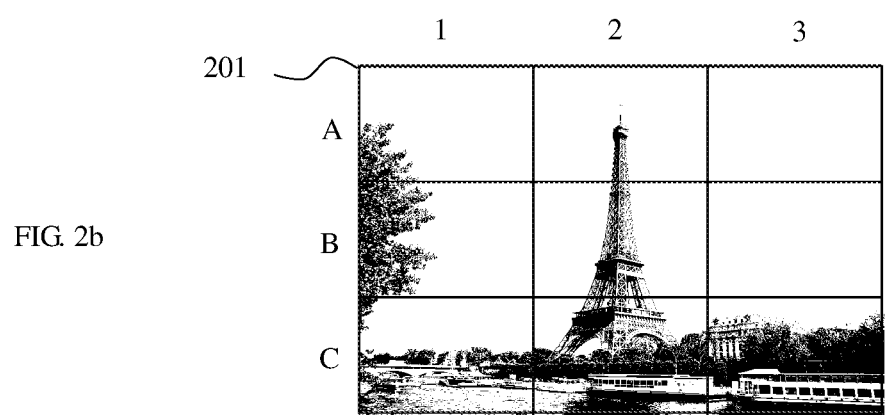
Figure 2C:
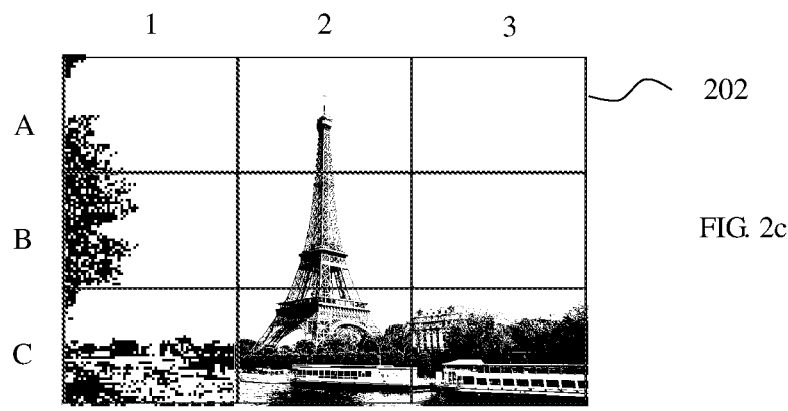
Figure 3:
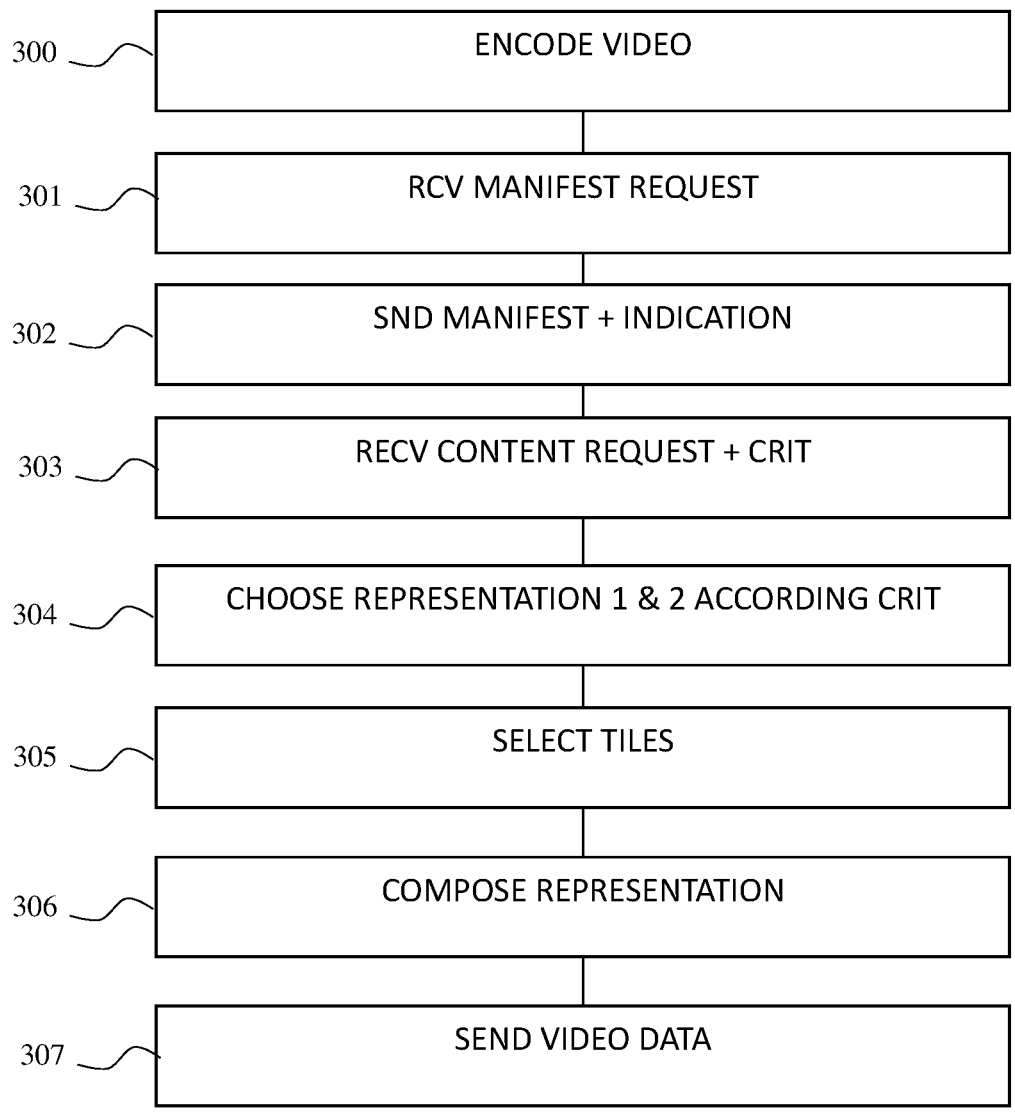
Figure 4A:
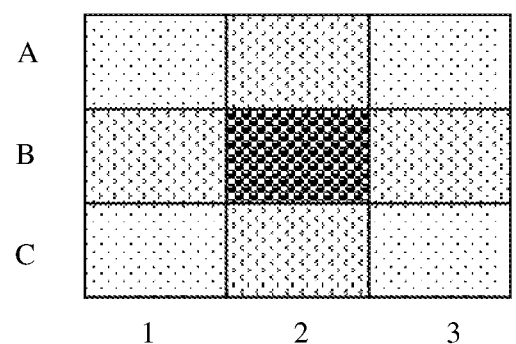
Figure 4B:
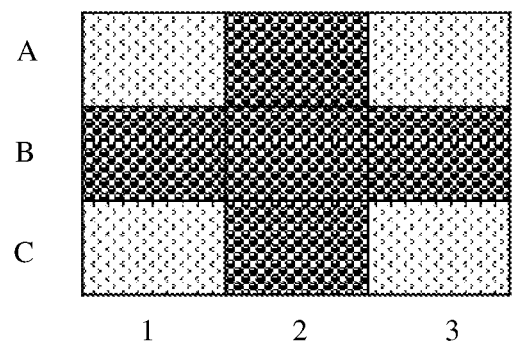
Figure 5:
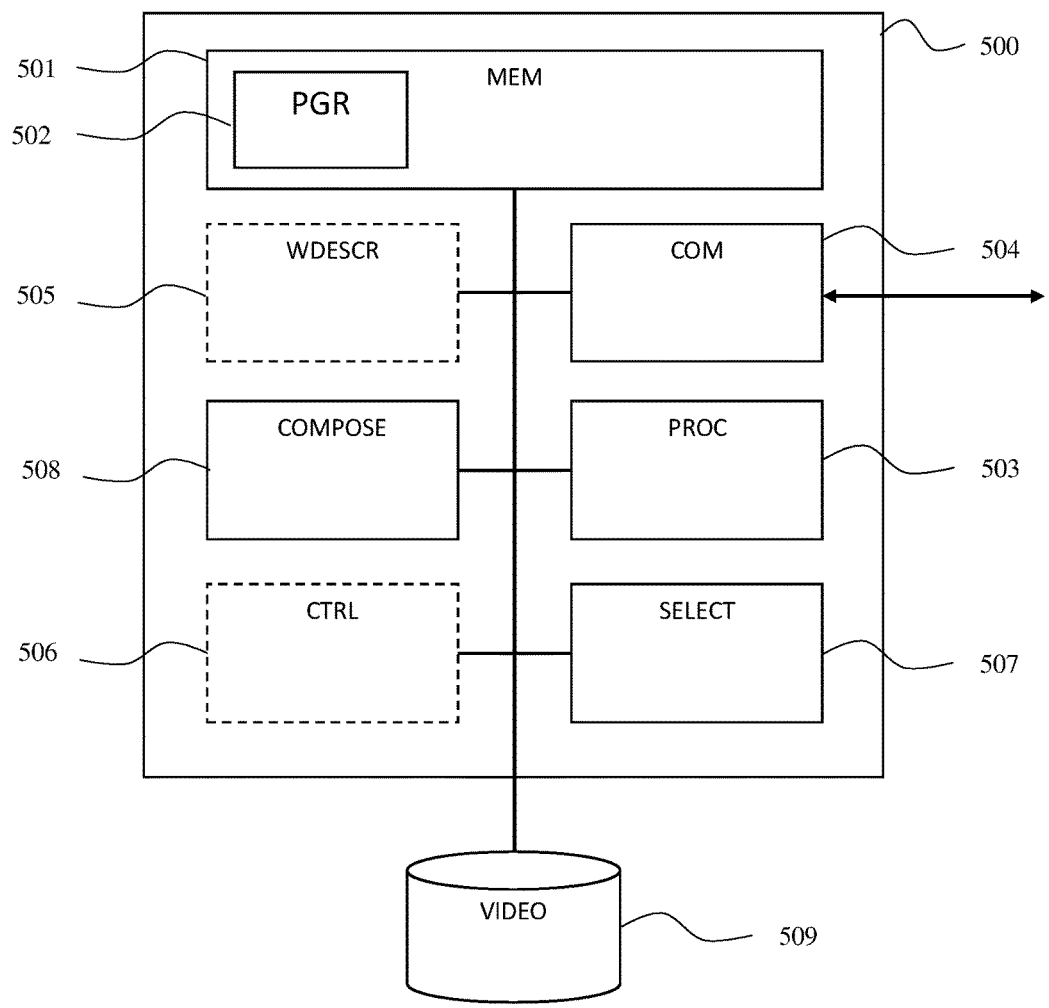
Figure 6:
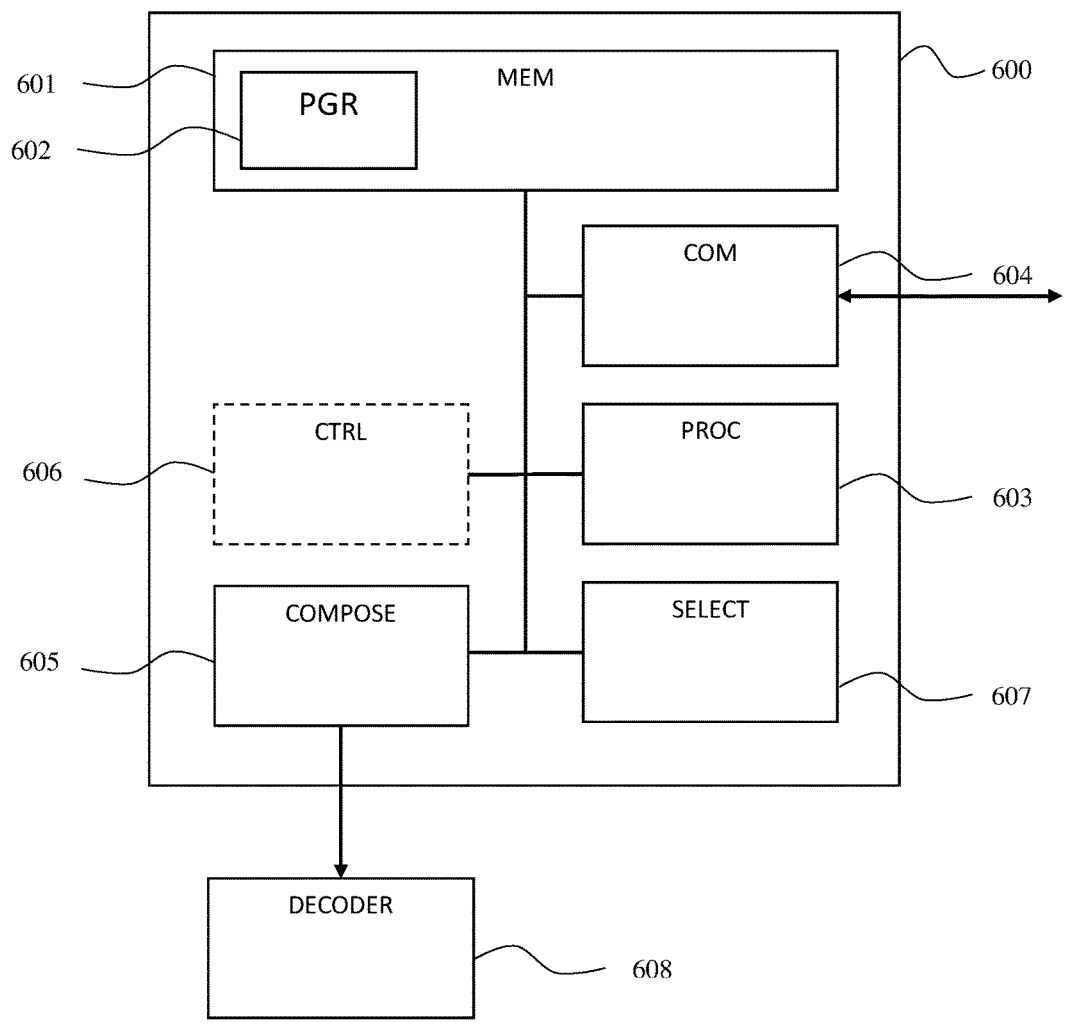
Figure 7:
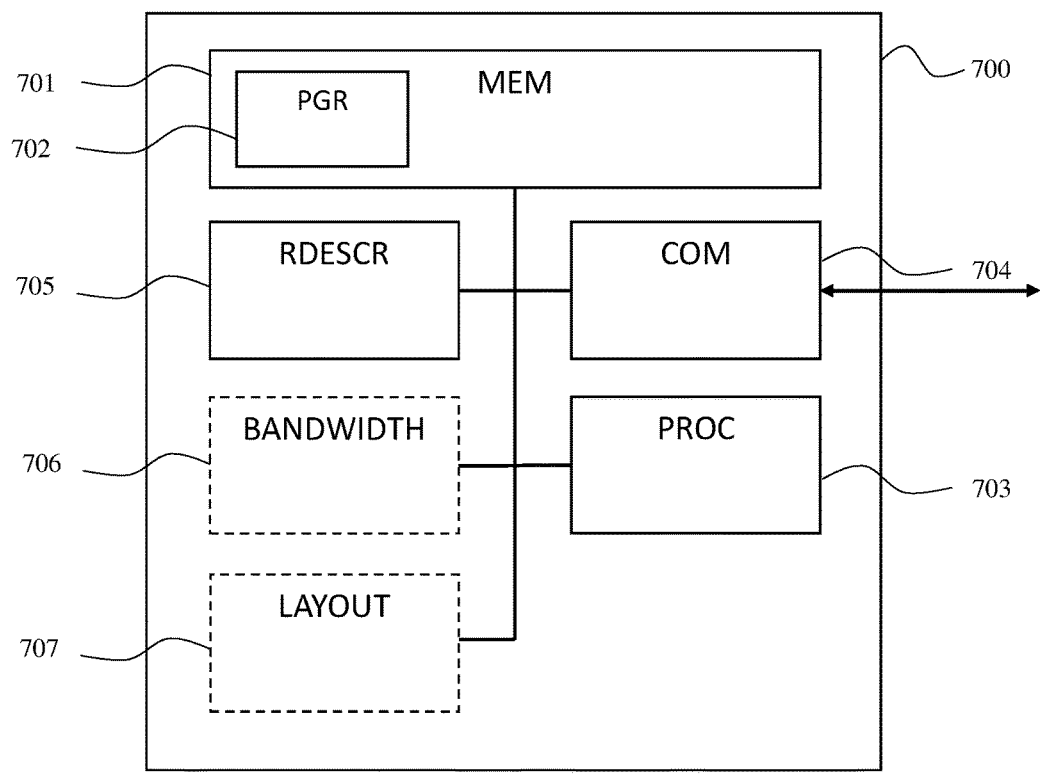

Other features and advantages of the invention will become more clearly apparent on reading the following description of a particular embodiment, given merely as an illustrative and nonlimiting example, and the attached drawings, in which:

FIG. 1 represents a simplified network architecture suitable for implementing the invention according to a particular embodiment, FIGS. 2a, 2b and 2c represent an example of composition of a video stream from two representations of one and the same stream offering a different image quality, FIG. 3 illustrates the main steps of the composition method according to a particular embodiment, FIGS. 4a and 4b represent, as examples, two ways of arranging tiles originating from different representations, FIG. 5 illustrates the architecture of a device suitable for implementing the composition method according to a particular embodiment, FIG. 6 illustrates the architecture of a device suitable for implementing the composition method according to another particular embodiment, FIG. 7 illustrates the architecture of a device suitable for implementing the method for downloading a representation according to a particular embodiment.

DETAILED DESCRIPTION OF AN EMBODIMENT

FIG. 1 represents a simplified architecture in which the composition method according to the invention is implemented.

Such an architecture comprises a client terminal 100, a communication network 101 and a content broadcast server 102. The content broadcast server 102 is suitable for supplying content to the terminal 100 via the network 101 which can for example be a network of IP (Internet Protocol) type. The terminal 100 is connected to the network 101 via a link 107.

In this example, the broadcast server makes audiovisual content 103 available to the terminal 100. The server 102 hosts different representations of the content, each of the representations being available according to a particular encoding profile. For example, the audiovisual content 103 has been encoded previously in a first representation 104 coded at 500 KB/s, a second representation 105 coded at 2 MB/s and a third representation 106 coded at 4 MB/s. In this way, the server 102 can supply the terminal 100 with a version of the audiovisual content suited to the bandwidth that it has available. For example, if the connection 107 allows a maximum bit rate of 1 MB/s, the server 102 will be able to supply it with the 500 KB/s representation so as to guarantee quality of service. Conventionally, the different representations available for the content 103 are announced in a manifest file that can be downloaded by the terminal 100 in order for the latter to be able to request the supply of the most suitable representation.

In the example presented here to illustrate the invention, the streaming architecture is based on the use of the HTTP (HyperText Transport Protocol) protocol and implements the MPEG-DASH (Dynamic Adaptive Streaming over HTTP) standard. This is the ISO/IEC 23009-1:2012(E) standard dedicated to the streaming of multimedia content over the Internet. The coding of the video content is here performed according to the HEVC (High Efficiency Video Coding, ISO/IEC 23008-2 MPEG-H Part 2 and ITU-T H.265) standard.

During the encoding of the different representations, the video encoder has been configured appropriately for the images which make up the sequence to be divided into rectangular regions called "tiles" forming a partition of the images according to a predefined grid. The partition of the images into tiles is an option offered for example by the HEVC standard in order to allow a parallelization of the encoding and decoding processes on multicore and/or multiprocessor computing architectures. For example, the video sequence can be partitioned into tiles according to the method described in the patent application US2014307775 "METHOD AND DEVICE FOR PARTITIONING AN IMAGE".

For example, to guarantee an independence of the tiles during the decoding, the motion vectors are confined within the tiles. Thus, the decoding of one tile does not require information contained in another tile. Also, to avoid the propagation of information from one tile to the other upon the application of "in-loop" filters such as the "deblocking filter" or the "sample adaptive offset filter", these filters are deactivated at the boundaries of the tiles by setting the "loop_filter_across_tiles_enabled_flag" parameter to zero in the PPS (Picture Parameter Set). According to the HEVC standard, the tiles are defined in the PPS (Picture Parameter Set). The PPS contains elements which specify the number of tiles in rows and of columns in an image, as well as their size. An HEVC video sequence is divided into different data segments which contain, in particular, the data of the tiles and the location of these data in the segment. A segment header comprises information on the content and the parameters of the segment, and in particular data making it possible to access the data of the tiles.

FIGS. 2a and 2b illustrate an example of partitioning of a video sequence. FIG. 2a illustrates a first low-quality representation 200 of a video sequence. The images of this sequence are divided into 9 tiles according to a grid of 3 rows and 3 columns. FIG. 2b illustrates a second representation 201 of the same sequence, encoded in high quality. The images corresponding to the same instant in the representation 200 and the representation 201 are partitioned identically. These representations have been encoded with the precautions described above so that the tiles can be decoded independently of one another. For example, the tile C2 of the representation 200 does not include any reference to information contained in the adjacent tiles and can be decoded independently of the other tiles of the image. On the other hand, this tile C2 can include references to this same tile C2 in the preceding or subsequent images, when they form part of the same GOP (Group Of Pictures).

Reference is now made to FIG. 3 which illustrates the main steps of the composition method according to a particular embodiment in which the method is implemented on the server 102.

During a preliminary step 300, a video sequence is encoded according to the HEVC standard, according to different encoding profiles. The video encoder is configured so as to partition the images into tiles that can be decoded independently of one another as described above. The configuration of the tiles in the different representations is identical for a given instant. The different representations of the sequence are made available to the users on a server, each representation being accessible through a particular URL (Uniform Resource Locator). The different representations available and their features are consigned to an MPD (Media Presentation Description) file. For example, the MPD file (also called "manifest") can comprise, for each of the representations available, URLs for accessing the different segments of a representation, the encoding bit rate, the video resolution, an index of the segments, etc. A representation is for example declared as follows in a manifest file according to the DASH standard:

```
<Representation id="1" bandwidth="4000000" width="1280" height="720">
   <SegmentList duration='3600'>
      <SegmentURL media= http://orange.com/movie1.mp4'/>
   </SegmentList>
</Representation>
```

In the step 301, the server receives a manifest file download request. The request originates from a terminal such as, for example, the terminal 100 of FIG. 1 whose connection 107 is limited to 1 MB/s.

During the step 302, the server transmits to the terminal a manifest file describing the representations available for a video sequence. This file also includes an indication representative of the capacity of the server to compose an intermediate representation of the video sequence. Thus, the decoding terminal 100 can determine, on receipt of the manifest file, that the server is capable of generating intermediate representations of the sequence. To this end, the server can indicate a particular parameter in the declaration of a representation. For example, for this purpose, the following declaration uses the particular value "custom" in the "bandwidth" attribute:

```
<Representation id="1" bandwidth="custom" width="1280" height="720">
   <SegmentList duration='3600'>
      <SegmentURL media= http://orange.com/movie2.mp4'/>
   </SegmentList>
</Representation>
```

This indication can also be communicated by other means, such as, for example, by using a parameter, a value or a particular attribute in the header of the manifest file.

On receipt of the manifest, the terminal 100 can then request an optimal representation given the bandwidth that it has available. To this end, it can send a download request to the URL indicated in the manifest, the request comprising in particular an indication of the maximum bit rate desired for the representation. The request comprises a criterion for obtaining an intermediate representation which can be a criterion of desired quality or, in the example described here, a criterion of maximum bit rate desired. The maximum bit rate is, for example, communicated to the server via a parameter of an http request. In this example, the terminal 100 can thus indicate that it wants to download an intermediate representation whose bit rate does not exceed the bandwidth of the link 107, that is to say 1 MB/s. Such a request is received by the server in the step 303.

In the step 304, the server 102 analyzes the request received and obtains the maximum video bit rate desired by the decoding terminal. From this bit rate information, the server selects, from the pre-encoded representations that it has available, a first pre-encoded representation whose bit rate is below the maximum bit rate indicated by the terminal and a second pre-encoded representation whose bit rate is above the maximum bit rate indicated by the terminal. For example, on receipt of a request indicating a maximum bit rate of 1 MB/s, the server 102 selects a first representation 104 encoded at 500 KB/s and a second representation 105 encoded at 2 MB/s.

In a step 305, the server selects a set of tiles forming a partition of the images of the sequence and made up of tiles originating from the first representation and the second representation, each tile being associated with compressed data in said representation, in order to obtain an intermediate representation whose bit rate lies between the encoding bit rate of the first representation and the encoding bit rate of the second representation. For example, from a first representation 200 illustrated in FIG. 2a and from a second representation 201 illustrated in FIG. 2b, the server can compose an intermediate representation 202 illustrated in FIG. 2c from the compressed data associated with the selected set of tiles. FIG. 2c is thus made up of a set of tiles {A1, B1, C1} derived from the first representation 200 and of a set of tiles {A2, B2, C2, A3, B3, C3} derived from the second representation 201. The bit rate of the representation 202 thus lies between the bit rate of the first representation 200 and that of the second representation 201. The selection can be made according to a criterion other than the bit rate, as a function of the criterion for obtaining the desired representation. That can be, for example, a criterion of quality or a criterion of preservation of a particular region of the image as will be described later.

At this stage, according to a particular embodiment, the server can compute the bit rate of the composed representation so as to compare it with the maximum bit rate indicated by the decoding terminal. Thus, if the bit rate of the composed intermediate representation is above the maximum bit rate indicated by the decoding terminal, the server can select a new set of tiles from the representations, the new set comprising a greater share of tiles originating from the representation whose bit rate is below the bit rate indicated by the terminal. Thus, after a certain number of iterations, the server can obtain an intermediate representation whose bit rate is optimal in light of the constraint set by the decoding terminal.

According to another particular embodiment, the set of tiles initially selected can comprise all the tiles of a representation apart from one tile, the tiles of another representation being added one by one on each iteration, as long as the bit rate of the composition is not optimal in light of the limit set by the terminal. For example, a first set of tiles can consist of the tiles {B1, C1, A2, B2, C2, A3, B3, C3} originating from the high-quality representation 201 of FIG. 2b and of the single tile {A1} originating from the representation 200. If the bit rate of the resulting composition is above the threshold set by the terminal, the server modifies the first set and the second set so as to replace a high-quality tile with a low-quality tile. To this end, the first set can comprise the tiles {C1, A2, B2, C2, A3, B3, C3} derived from the representation 201 and the second set the tiles {A1, B1} derived from the second set. The steps are thus repeated until the bit rate of the resulting composition is below or equal to the maximum bit rate set.

According to a particular embodiment, at least one set of tiles is selected prior to the receipt of a download request, the arrangement of the tiles and the representation from which each of them is derived being stored in a description file stored for example in a storage space associated with the server. For example, the description file can comprise, for each of the images of the sequence, and for each tile of an image, a link to the data of the tiles in the corresponding representations. The representations thus composed can be declared in a manifest file in the same way as pre-encoded representations. In this way, on receipt of a download request designating a duly stored representation, the corresponding data are transmitted to the decoding terminal. This embodiment makes it possible to increase the number of representations available for a video sequence while requiring only little additional storage space.

According to a particular embodiment of the invention, the selection of a set of tiles is made according to the encoding bit rate of each of the tiles. The method thus makes it possible to form the set of tiles according to the weight, in terms of bandwidth occupancy, of each of them, which offers the advantage of knowing in advance the bit rate of the intermediate representation resulting from the assembly of these tiles. In particular, when the representation is composed with a maximum bit rate constraint, the method makes it possible to observe this constraint from the time of the formation of the set of tiles. It is possible to obtain the weight of a particular tile from the parameters contained in the encoded stream. For example, by consulting the SPS (Segment Parameter Set), the PPS (Picture Parameter Set), it is possible to know the type and the position of the tiles in the different representations and deduce therefrom their respective weight.

According to another particular embodiment, certain regions of the image are prioritized during the selection of the tiles. For example, when regions of the image exhibit a particular interest, the tiles corresponding to these locations are selected by preference from a representation of good quality. Conversely, the regions of the image exhibiting little interest can be selected from a low-quality representation. The regions of interest can be defined automatically, by using, for example, image analysis techniques like face detection. Thus, during the step of selection of the tiles, the tiles containing regions of interest are selected by preference from a representation of good quality.

According to a particular embodiment, the regions of the image to be prioritized during the selection of the set of tiles are indicated in a message transmitted by a video decoding terminal. Thus, the method can receive a message indicating to it a region to be prioritized or else a predetermined arrangement of tiles. The decoding terminal 100 represented in FIG. 1 comprises, for example, a touch interface allowing a user to select a region of the image. Following the selection of a particular region by the user, the decoding terminal sends a message to the broadcast server, the message comprising in particular the coordinates of the selected region and, optionally, an item of information on quality desired for the region. On receipt of this message, the broadcast server can select the tiles corresponding to the region indicated from a pre-encoded high-quality representation. In this way, the method allows a user to designate the regions of a video that he or she wants to see in good quality. The terminal 100 can also offer the user different predetermined arrangements of tiles. For example, the terminal can prompt the user to compose an intermediate representation based on one of the tile arrangements represented in FIGS. 4a and 4b, in order to automatically prioritize certain regions of the image. The terminal can offer an interface allowing the user to select a particular arrangement before sending a message to the server when an arrangement is validated, the message comprising the indications the server needs to compose an intermediate representation according to the chosen arrangement.

According to a particular embodiment, a tile is selected according to the selection made for adjacent tiles. For example, when an intermediate representation is composed from compressed data associated with the tiles originating from the three pre-encoded representations 104, 105 and 106 illustrated in FIG. 1, it may be that a first tile is selected in the low-quality representation 104 and that a tile adjacent to this first tile is selected in the high-quality representation 106. The fact that these tiles of very different quality are contiguous poses a problem of uniformity of the composed image and can be prejudicial to the quality perceived by the user. To avoid that, the method proposes selecting a tile in a particular representation according to the choices made for the adjacent tiles. For example, FIG. 4a illustrates an intermediate representation composed from tiles derived from the pre-encoded representations 104, 105 and 106 described with reference to FIG. 1. A high-quality tile has been selected in the position B2, at the center of the image. The adjacent tiles A2, B1, C2 and B3 are then selected in the medium-quality representation 105, the tiles A1, C1, A3 and C3 being selected in the low-quality representation 104. In this way, the method can limit the quality differences at the tile edges.

In the step 306, when a set of tiles that satisfies the criterion of maximum bit rate of the representation is selected, the server can extract the corresponding data when they are requested by the decoding terminal. The data corresponding to a particular tile of a representation can be obtained for example according to the method described in the patent application US2014307775 "METHOD AND DEVICE FOR PARTITIONING AN IMAGE". From the data of the tiles, each coded image is reconstructed then transmitted to the decoding terminal in a step 307.

According to a particular embodiment, the method is implemented on a decoding terminal. In this particular case, the terminal uses the MPD file in order to know the URLs for accessing the segments of the different representations available. For a given segment, the terminal downloads, from at least two representations, the data of the segment enabling it to select a set of tiles. For example, the terminal can download, using a "byte-range" request, the SIDX (Segment Index), SSIX (SubSegment IndeX), PPS (Picture Parameter Set), SPS (Segment Parameter Set) and SEI (Supplemental Enhancement Information) in order to know the arrangement of the tiles in the image and the location of the data corresponding to these tiles in the segment. The terminal then has the information necessary to the execution of the steps 305 and 306 described with reference to FIG. 3.

FIG. 5 illustrates a device 500 implementing the composition method, according to a particular embodiment of the invention. The device comprises a storage space 501, for example a memory MEM, a processing unit 503 equipped, for example, with a processor PROC. The processing unit can be driven by a program 502, for example a computer program PGR, implementing the method for composing an intermediate representation as described in the invention with reference to FIG. 3, and in particular the steps of selection, according to at least one selection criterion, of a set of tiles forming a partition of the sequence and made up of tiles originating from the at least two representations, and of composition of an intermediate representation of the video sequence from the compressed data of the selected set of tiles.

On initialization, the instructions of the computer program 502 are, for example, loaded into a RAM (Random Access Memory) memory before being executed by the processor of the processing unit 503. The processor of the processing unit 503 implements the steps of the composition method according to the instructions of the computer program 502.

To this end, the device comprises, in addition to the memory 501, communication means 504 (COM) allowing the device to connect to a telecommunication network and to exchange data with other devices via the telecommunication network, and for example to receive requests to download a manifest file or at least a part of a representation of video content. These communication means can for example be a network interface and can also be used to transmit a manifest file comprising an indication representative of a capacity of the device to compose an intermediate representation of a video sequence and/or at least a part of a representation of video content. The device also comprises a unit 507 for selecting, according to at least one selection criterion, a set of tiles forming a partition of the sequence and made up of tiles originating from the at least two representations, and a unit 508 for composing an intermediate representation of the video sequence from the compressed data of the selected set of tiles.

According to a particular embodiment, the device can also comprise a unit 505 (WDESCR) for generating an indication representative of a capacity to compose an intermediate representation of a video sequence and a unit 506 (CTRL) for computing the resulting bit rate of the intermediate representation and for checking that the resulting bit rate is below a predetermined threshold. According to another embodiment, the device can comprise a database 509 for storing intermediate representations in the form of a description of the assembly of tiles and of the pre-encoded representations from which they are derived.

According to a particular embodiment, the device can be incorporated in a server, such as, for example, a video broadcast server.

FIG. 6 illustrates another device 600 implementing the composition method according to a particular embodiment of the invention suitable for use in a video decoding terminal. The device comprises a storage space 601, for example a memory MEM, a processing unit 603 equipped, for example, with a processor PROC. The processing unit can be driven by a program 602, for example a computer program PGR, implementing the method for composing an intermediate representation as described in the invention, and in particular the steps of selection, according to at least one selection criterion, of a set of tiles forming a partition of the sequence and made up of tiles originating from the at least two representations, and of composition of an intermediate representation of the video sequence from the compressed data of the selected set of tiles.

On initialization, the instructions of the computer program 602 are for example loaded into a RAM (Random Access Memory) memory before being executed by the processor of the processing unit 603. The processor of the processing unit 603 implements the steps of the composition method according to the instructions of the computer program 602.

To this end, the device comprises, in addition to the memory 601, communication means 604 (COM) allowing the device to connect to a telecommunication network and to exchange data with other devices via the telecommunication network. These communication means can for example be a network interface and can be used to download at least a part of a representation of video content such as, for example, encoding parameters such as SIDX, SSIX, SPS, PPS and SEI data in the case of content encoded according to the HEVC standard, or else the data corresponding to tiles originating from different representations. The device also comprises a unit 607 (SELECT) for selecting, according to at least one selection criterion, a set of tiles forming a partition of the sequence and made up of tiles originating from the at least two representations, and a unit 605 (COMPOSE) for composing an intermediate representation of the video sequence from the compressed data of the selected set of tiles, suitable for reconstructing a video stream according to the coding standard and for transmitting this stream to a video decoder 608. According to a particular embodiment, the device can also comprise a unit 606 (CTRL) for estimating the bandwidth available, for computing the resulting bit rate of a composed intermediate representation and for checking that the resulting bit rate is below a predetermined threshold.

According to a particular embodiment, the device can be incorporated in a video decoding terminal of cellphone, set-top box, video decoder or connected television type, or else, for example, in a personal computer.

FIG. 7 illustrates a device 700 implementing the method for downloading an intermediate representation according to a particular embodiment. The device comprises a storage space 701, for example a memory MEM, a processing unit 703 equipped, for example, with a processor PROC. The processing unit can be driven by a program 702, for example a computer program PGR, implementing the method for downloading an intermediate representation as described in the invention, and in particular the steps of reading an indication representative of the capacity of a server to compose an intermediate representation of a video sequence, of transmitting a tile selection criterion, and of receiving an intermediate representation composed according to the selection criterion transmitted.

On initialization, the instructions of the computer program 702 are for example loaded into a RAM (Random Access Memory) memory before being executed by the processor of the processing unit 703. The processor of the processing unit 703 implements the steps of the downloading method according to the instructions of the computer program 702.

To this end, the device comprises, in addition to the memory 701, communication means 704 (COM) allowing the device to connect to a telecommunication network and to exchange data with other devices via the telecommunication network. These communication means can for example be a network interface and can be used to obtain an indication representative of a capacity of the device to compose an intermediate representation of a video sequence by downloading, for example, a manifest file comprising such an indication. The communication means 704 can also be used to transmit a tile selection criterion to a video broadcast server suitable for composing an intermediate representation according to the present invention and receiving an intermediate representation composed according to the criterion transmitted. According to a particular embodiment, the device comprises a unit 706 (BANDWIDTH) suitable for estimating the bandwidth available for receiving a video stream. It can for example be a unit for monitoring the level of filling of a buffer memory of a video decoder. The device can also comprise a user interface 707 (LAYOUT) suitable for defining a tile selection criterion, the criterion being able to correspond for example to a set of tiles to be selected in a predetermined representation.

According to a particular embodiment, the device can be incorporated in a video decoding terminal of cellphone, set-top box, video decoder or connected television type, or else, for example, in a personal computer.

Although the present disclosure has been described with reference to one or more examples, workers skilled in the art will recognize that changes may be made in form and detail without departing from the scope of the disclosure and/or the appended claims.

The invention claimed is:

1. A method comprising the following acts performed by a video composing device:
   composing an intermediate representation of a video sequence from at least first and second representations of said video sequence, said at least first and second representations being spatially partitioned into a plurality of tiles, each tile being associated with compressed data in said representation, wherein the tiles can be decoded independently of one another and, at a given instant, the first and second representations are partitioned identically, wherein composing comprises the following acts:
   selecting, according to at least one selection criterion and the location of each tile, a set of tiles forming a partition of the sequence, said set comprising at least one tile originating from the first representation and at least a tile originating from the second representation,
   storing in a description file, the arrangement of tiles along with the pre-encoded representations from which they are derived so as to form a composed representation of the video sequence, said intermediate representation, whose bitrate is between a bitrate of the first representation and a bitrate of the second representation,
   generating a manifest file including a link to said intermediate representation,
   transmitting the manifest file to a video decoding terminal, and
   upon receipt of a download request corresponding to the link included in the manifest file, transmitting the corresponding data to the video decoding terminal.

2. The method as claimed in claim 1, wherein the method further comprises acts of:
   computing a resulting bit rate of the intermediate representation,
   checking that the resulting bit rate is below a predetermined threshold, and
   selecting a new set of tiles when the resulting bit rate is above the predetermined threshold.

3. The method as claimed in claim 1, wherein the at least one selection criterion comprises a tile encoding bit rate.

4. The method as claimed in claim 1, wherein the act of selecting a set of tiles is also based on an analysis of content of the images.

5. The method as claimed in claim 1, wherein the act of selecting a set of tiles is made also according to a criterion for selection of at least one adjacent tile.

6. A method comprising the following acts performed by a video decoding terminal:
downloading an intermediate representation of a video sequence on the video decoding terminal from a communication network, which comprises the following acts:
receiving a manifest file comprising at least one link to said intermediate representation, composed of at least one tile originating from a first representation and from at least one tile originating from a second representation, a bitrate of said intermediate representation being between a bitrate of the first representation and a bitrate of the second representation,
transmitting a request for downloading said intermediate representation, and
receiving the intermediate representation.

7. A device comprising:
a non-transitory computer-readable medium comprising instructions stored thereon; and
a processor configured by the instructions to compose an intermediate representation of a video sequence from at least first and second representations of said video sequence, said at least first and second representations being spatially partitioned into a plurality of tiles, each tile being associated with compressed data in said representation, wherein the tiles can be decoded independently of one another and in that, at a given instant, the first and second representations are partitioned identically, and wherein composing comprises:
selecting, according to at least one selection criterion and the location of each tile, a set of tiles forming a partition of the sequence, said set comprising at least one tile originating from the first representation and at least a tile originating from the second representation,
storing in a description file, the arrangement of tiles along with the pre-encoded representations from which they are derived so as to form a composed representation of the video sequence, said intermediate representation, whose bitrate is between a bitrate of the first representation and a bitrate of the second representation,
generating a manifest file including a link to said intermediate representation,
transmitting the manifest file to a video decoding terminal, and
upon receipt of a download request corresponding to the link included in the manifest file, transmitting the corresponding data to the video decoding terminal.

8. A video server comprising the device as claimed in claim 7.

9. The video server as claimed in claim 8, wherein the processor is further configured to transmit an indication representative of a capacity to compose an intermediate representation of a video sequence.

10. A terminal comprising the device as claimed in claim 7.

11. A device comprising:
a non-transitory computer-readable medium comprising instructions stored thereon; and
a processor configured by the instructions to download an intermediate representation of a video sequence from a communication network, wherein downloading comprises:
receiving a manifest file comprising at least one link to said intermediate representation, composed of at least one tile originating from a first representation and from at least one tile originating from a second representation, a bitrate of said intermediate representation being between a bitrate of the first representation and a bitrate of the second representation,
transmitting a request for downloading said intermediate representation, and
receiving the intermediate representation.

12. A terminal comprising the device as claimed in claim 11.

13. A non-transitory processor-readable information medium on which is stored a computer program comprising instructions for executing a method of composing when the instructions are executed by a processor of a composing device, wherein the instructions configure the composing device to perform acts comprising:
composing an intermediate representation of a video sequence from at least first and second representations of said video sequence, said at least first and second representations being spatially partitioned into a plurality of tiles, each tile being associated with compressed data in said representation, wherein the tiles can be decoded independently of one another and, at a given instant, the first and second representations are partitioned identically, and wherein composing comprises:
selecting, according to at least one selection criterion and the location of each tile, a set of tiles forming a partition of the sequence, said set comprising at least one tile originating from the first representation and at least a tile originating from the second representation,
storing in a description file, the arrangement of tiles along with the pre-encoded representations from which they are derived so as to form a composed representation of the video sequence, said intermediate representation, whose bitrate is between a bitrate of the first representation and a bitrate of the second representation,
generating a manifest file including a link to said intermediate representation,
transmitting the manifest file to a video decoding terminal, and
upon receipt of a download request corresponding to the link included in the manifest file, transmitting the corresponding data to the video decoding terminal.

14. A non-transitory processor-readable information medium on which is stored a computer program comprising instructions for executing a method of downloading when the instructions are executed by a processor of a video decoding terminal, wherein the instructions configure the video decoding terminal to perform acts comprising:
downloading an intermediate representation of a video sequence on the video decoding terminal from a communication network, which comprises the following acts:
receiving a manifest file comprising at least one link to said intermediate representation, composed of at least one tile originating from a first representation and from at least one tile originating from a second representation, a bitrate of said intermediate representation being between a bitrate of the first representation and a bitrate of the second representation, transmitting a request for downloading said intermediate representation, and receiving the intermediate representation.

\* \* \* \* \*